May 17, 1966

JAMES E. WEBB

ADMINISTRATOR OF THE NATIONAL AERONAUTICS AND SPACE ADMINISTRATION 3,252,100

PULSE GENERATING CIRCUIT EMPLOYING SWITCH-MEANS ON ENDS OF DELAY LINE FOR ALTERNATELY CHARGING AND DISCHARGING SAME

Filed Oct. 7, 1963

INVENTOR.

FAUSTO V. TADDEO

BY

ATTORNEYS

United States Patent Office 3,252,100

Patented May 17, 1966

3,252,100

PULSE GENERATING CIRCUIT EMPLOYING SWITCH-MEANS ON ENDS OF DELAY LINE FOR ALTERNATELY CHARGING AND DISCHARGING SAME

James E. Webb, Administrator of the National Aeronautics and Space Administration, with respect to an invention of Fausto V. Taddeo Filed Oct. 7, 1963, Ser. No. 314,570
6 Claims. (Cl. 328—67)

Figure 1:
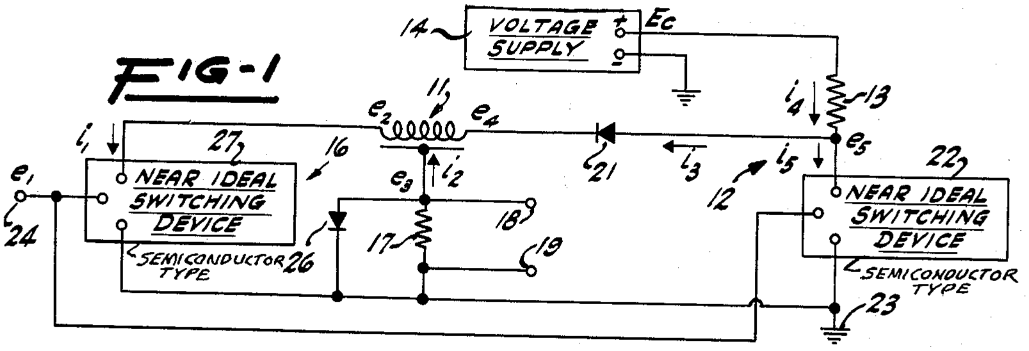

The present invention relates to pulse generating circuits of the type wherein a delay line is charged and discharged to generate pulses with widths determined and controlled by the length of the delay line, and is more particularly directed to a pulse circuit of this type which is arranged to operate at very high duty cycles and repetition rates respectively approaching the theoretical maximums of 50 percent and one-half the reciprocal of the pulse width.

In various applications it is necessary to provide pulses whose amplitude and duration do not appreciably vary despite large variations in triggering voltage and repetition rate, supply variations, environmental changes, equipment aging, and the like. Under these circumstances it is the usual practice to employ pulse forming circuits which include delay lines to determine and control the width of the pulses substantially independently of all circuit parameters except for the delay line itself. The pulses formed are accordingly relatively insensitive to shifts in operating conditions such as those noted above. However, conventional pulse forming circuits employing delay lines have been limited as to the repetition rates and duty cycles at which they may be operated. More particularly, such circuits are generally highly capacitive, particularly in the switching elements employed to effect charging and subsequent discharging of the delay line. By virtue of the high circuit capacitance, the switching times and pulse rise and fall times are significantly large relative to the durations of the generated pulses. This, of course, is limiting upon the maximum duty cycle and repetition rates at which the pulse forming circuit may be operated. The repetition rates and duty cycles are far too low for some applications involving very high repetition rate trigger pulses such as are encountered, for example, in the measurement of rapidly changing pulse frequencies which occur in the Doppler returns from missiles or spacecraft. More particularly, for reliable measurement of pulse frequencies in this particular application, it has been found that a pulse forming circuit is required which can be operated at very high duty cycles of the order of 30 percent and repetition rates of the order of 10 megacycles. Conventional pulse forming circuits fall far short of these capabilities, with the result that a substantial number of the trigger pulses to be measured are lost in the pulse output from the pulse forming circuit and, accordingly, a substantial degree of unreliability is introduced in the measurement thereof.

Therefore, it is an object of the present invention to provide an improved pulse generator which is capable of operation at very high duty cycles and repetition rates approaching the theoretical maximums of 50 percent and one-half the reciprocal of the pulse width, respectively, while at the same time possessing pulse width stability irrespective of shifts in operating conditions, such as substantial variations in amplitude and repetition rates of the trigger pulses, equipment aging, changes in environmental conditions, supply voltage variations, and the like.

Another object of the invention is the provision of a pulse generator for generating stable pulses having fast rise and fall times at high power levels.

A more specific object of the invention is to provide for the formation of pulses having durations of the order of 30 millimicroseconds and rise and fall times of the order of 10 millimicroseconds at a power level of the order of 5 volts and 50 milliamperes peak, which pulses may be generated at very high duty cycles of the order of 30 percent and reptetition rates of the order of 10 megacycles.

Yet, another object of the invention is to provide a pulse forming circuit of the class described wherein a delay line is charged through a resistance equal to the characteristic impedance of the line and is subsequently discharged through a resistance of equal value, commensurate with charging and discharging of the line in minimum lengths of time respectively equal to substantially twice the delay time of the line.

It is a further object of the invention to provide a delay line pulse forming circuit which employs semiconductor switching devices in the charging and discharging of the line with a negligible contribution to circuit capacitance, such that the switching times are small relative to the pulse duration.

Figure 2:
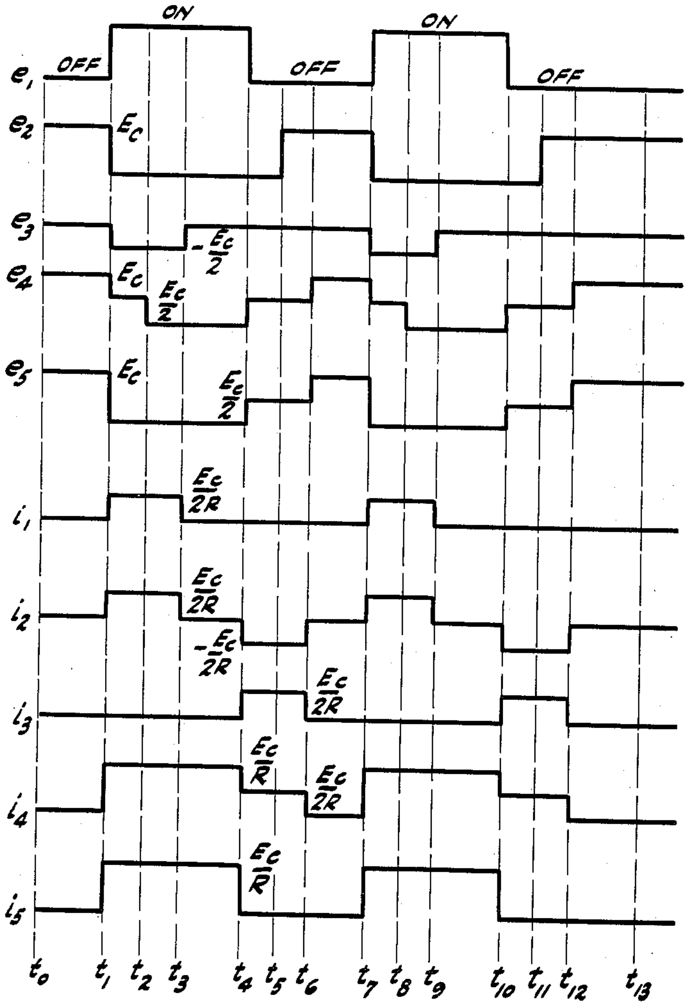

Further objects and advantages of the invention will become apparent upon consideration of the following description in conjunction with the accompanying drawing, wherein:

FIGURE 1 is a schematic circuit diagram of the pulse forming circuit of the present invention, and FIGURE 2 is a graphical presentation of voltage and current waveforms existing at various points of the circuit of FIGURE 1.

Referring now to FIGURE 1, the pulse forming circuit or generator will be seen to include a delay line 11 which is coupled at one end through switching means 12 to charging means including a charging resistance 13 and a voltage supply 14 connected in series. The opposite end of the delay line 11 is coupled through switching means 16 to discharging means including a discharge resistance 17. The switching means 12 and 16 operate in concert to respectively couple the charging resistance 13 and voltage supply 14 to the first end of the delay line 11 and to simultaneously decouple the discharging resistance 17 from the second end of the line during a first time interval equal to at least twice the one-way delay time of the line, and to decouple the charging resistance and voltage supply 14 from the first end of the line and simultaneously couple the discharging resistance 17 across the second end of the line during a second time interval equal to at least twice the one-way delay time of the line. Accordingly, during the first time interval, the second end of the line is open circuited while the voltage supply 14 and charging resistance 13 are coupled across the first end of the line. The charging resistance 13 is preferably selected to be equal to the characteristic impedance of the delay line 11 such that the line is fully charged in a time interval equal to twice the one-way delay time of the line. More particularly, with the open circuited line charged through resistance 13 equal to the characteristic impedance of the line, the voltage wave generated when the voltage supply 14 is coupled to the line at the start of the first time interval propagates along the line to its open circuited end and is thereat reflected without inversion, to in turn propagate to the first end of the line and fully charge same to the voltage of the supply in a time interval equal to twice the one-way delay time of the line. This is, of course, the minimum time interval in which the line may be charged. Upon initiation of the second time interval when the charging resistance 13 and voltage supply 14 are decoupled from the first end of the line and this end of the line is hence open circuited, while the discharging resistance 17 is placed across the opposite end of the line, the charge stored in the line discharges through the resistance 17. In this regard, the discharging resistance 17 is preferably selected to be equal to the characteristic impedance of the delay line 11 such that during the second time interval there is provided a delay line with an open circuit at one end and a resistance equal to the characteristic impedance of the line at the other end. Under the circumstances, the delay line 11 discharges through the resistance 17 in a time interval equal to twice the one-way delay time of the line, which is the shortest possible time interval in which the line may be discharged. A pulse is generated across the discharge resistance 17 having a width equal to substantially twice the delay time of the line 11 and an amplitude equal to substantially half the voltage to which the line was previously charged, i.e., half the magnitude of the voltage of supply 14. The pulse generated across the discharging resistance 17 thus has a width which is entirely determined and controlled by the length of the delay line 11 independent of other parameters of the circuit and, therefore, any variations therein. This stable pulse comprises the useful pulse output of the pulse generator and, accordingly, output terminals 18 and 19 may be advantageously connected to the opposite ends of the discharging resistance 17 to facilitate the ready connection of auxiliary pulse monitoring apparatus or the like in receiving relation thereto.

It is particularly important to note that, where the switching times of the switching means 12 and 16 are negligible, the first and second time intervals of previous mention may be alternately established such that the termination of one interval coincides with the initiation of the other. Furthermore, these time intervals may each be made equal to twice the one-way delay time of the delay line 11. The switching time intervals then substantially correspond to the charging and discharging times of the line, which, as noted hereinbefore, are the minimum possible. Accordingly, with switching accomplished under the foregoing circumstances by the switching means 12 and 16, the pulse generator may be operated at extremely high duty cycles approaching the theoretical maximum of 50 percent and very high repetition rates approaching the theoretical maximum of one-half the reciprocal of the width of the output pulse or one-fourth the reciprocal of the one-way delay time of the delay line 11.

In the accomplishment of the foregoing, the switching means 12 and 16 are arranged to contribute negligible capacitance to the pulse generating circuit such that switching times are minimal compared to the durations of the output pulses, and the delay line 11 is terminated in substantially pure resistances equal to the characteristic impedance of the line during the charging and discharging thereof. To the foregoing ends, the switching means 12 and 16 preferably comprise semiconductor devices having negligible capacitance and arranged in an appropriate manner to accomplish the desired switching function. More particularly, the switching means 12 preferably includes a semiconductor diode 21 having its negative terminal connected to one conductor of the delay line 11 and its positive terminal connected to the opposite side of the charging resistance 13 from that to which the voltage supply 14 is connected. In addition, a near ideal three-terminal switching device 22, preferably a transistor, is provided with one switching terminal connected to the juncture between the diode 21 and resistance 13 and the other switching terminal connected to ground, as indicated at 23. The control terminal of the switching device 22 is connected to a trigger pulse input terminal 24 such that in response to the application of a trigger pulse to the terminal 24 the switching device 22 establishes a negligible impedance conduction path between the switching terminals thereof for the duration of the trigger pulse.

In the absence of a trigger pulse at the terminal 24, an open circuit is established between the switching terminals of the switching device 22. Similarly, the switching means 16 preferably includes a semiconductor diode 26 connected in parallel with the discharging resistance 17.

The positive terminal of the diode 26 is connected to the opposite conductor of the delay line 11 from that to which the diode 21 is connected, while the negative terminal of diode 26 is connected to ground. In addition, a near ideal three-terminal switching device 27, similar to the switching device 22 and therefore preferably a transistor, is provided with one switching terminal connected to the same delay line conductor as that to which the diode 21 is connected, but at the opposite end of the line therefrom. A second switching terminal of the switching device 27 is connected to ground. The control terminal of the switching device 27 is connected to the trigger input terminal 24 and is hence in parallel with the control terminal of the switching device 22. Thus, assuming the delay line to have been previously fully charged, the application of a trigger pulse to terminal 24 effects closure of the switching devices 22 and 27 in a substantially instantaneous manner. Switching device 22 thus grounds the positive terminal of diode 21 and by virtue of the charge existing on the delay line 11 effects back biasing of the diode to hence decouple the delay line from the charging resistance 13 and voltage supply 14. Simultaneously, the switching device 27 connects the other end of the delay line 11 to ground and thereby establishes a ground return path which connects the discharging resistance 17 across the line. The charge existing on the line is such as to back bias the diode 26 so that in effect only the resistance 17 appears across the line. The line 11 then discharges through the resistance 17 in a time substantially equal to twice the one-way delay time of the line to thus produce a pulse across the resistance, and therefore between the output terminals 18 and 19, having a width equal to this time interval as determined by the delay line.

After discharge of the line, the circuit is inactive until termination of the trigger pulse at terminal 24 whereupon the switching devices 22 and 27 are respectively substantially instantaneously open circuited. At this instant, the juncture between diode 21 and charging resistance 13 is decoupled from ground by virtue of the open circuit through switching device 22 and a positive voltage appears at this juncture to bias the diode 21 in the forward direction and apply the voltage to the delay line 11. Simultaneously, switching device 27 decouples the other end of the delay line from ground to open circuit same. Furthermore, the charging current drawn by the delay line due to the charging voltage applied thereto is in a direction to forward bias the diode 26 and thereby establish a short circuit to ground across the discharging resistance 17 and, hence, in effect decouple same from the circuit. A ground return charging path is thus established through the voltage supply 14, charging resistance 13, diode 21, delay line 11, and diode 26 whereby the line is fully charged in a time equal to twice the one-way delay time of the line. Subsequent to this charging interval, the circuit is primed for another cycle of operation in response to the subsequent application of a trigger pulse to the input terminal 24.

The operation of the pulse generator, as outlined above, will be better understood upon consideration of the wave shapes depicted in FIGURE 2, which wave shapes are for voltage and current at various points of the circuit of FIGURE 1. In the example of wave shapes shown, ideal conditions are assumed whereby the switching devices 22 and 27 exhibit zero contact resistance and the diodes 21 and 26 have zero potential drop when conducting. Moreover, the resistances 13 and 17 are assumed to be each equal to the characteristic impedance of the delay line 11. Furthermore, a time recurrent square wave pulse train $e_1$ is supplied to the input terminal 24 to trigger the switching devices 22 and 27 between off and on states. More particularly, as illustrated in FIGURE 2, at a time $t_0$ the trigger pulse wave train $e_1$ has a potential commensurate with the maintenance of switches 22 and 27 in nonconducting, or off condition. At a time $t_1$ the wave train reverts to a potential commensurate with the establishment of a conducting, or on condition, of the switching devices 22 and 27, and this on condition prevails until a time $t_4$ when the trigger pulse wave train returns to the off condition. The off condition is maintained until a time $t_7$ when the wave train again reverts to the on condition which is, in turn, maintained until a time $t_{10}$ when the off condition is again established.

At time $t_0$, it is to be noted from waveforms $e_2$ and $e_4$, that the delay 11 has been fully charged to its maximum value of, $E_c$, volts, which is the voltage at the output terminals of voltage supply 14. As noted above, the switches 22 and 27 are in the off condition at this time. Also, no current flows in any portion of the circuit at time $t_0$ as will be apparent from the current waveforms $i_1$ through $i_5$. The circuit is thus primed for the generation of a pulse at time $t_1$ when the switching devices 22 and 27 are simultaneously closed. Switching device 22 at this time shorts the juncture between resistance 13 and diode 21 to ground 23. This is apparent from the voltage wave $e_5$, which denotes the voltage at the juncture, and which at time $t_1$ goes from the voltage $E_c$ to ground potential. Since the initial charge of the delay line 11 has been positive (see waveform $e_4$, in time interval $t_0$–$t_1$), the diode 21 becomes back biased at time $t_1$ the potential appearing thereacross being the difference between the waveforms $e_4$ and $e_5$. The diode 21 hence decouples the delay line 11 from the charging resistance 13 and voltage supply 14 at time $t_1$. The opposite end of the delay line 11, however, is shorted to ground at time $t_1$ through the now closed switching device 27. As noted previously, the discharging resistance 17 is placed across the delay line 11 by this action, and the delay line hence begins to discharge through the resistance 17 at time $t_1$. Moreover, since resistance 17 is equal to the characteristic impedance of delay line 11, the discharge action is complete in a time interval equal to twice the one-way delay time of the line, which time interval in FIGURE 2 is depicted between $t_1$ and $t_3$. The voltage waveform across resistance 17 is designated as $e_3$ and it will be noted that during the interval $t_1$–$t_3$, this waveform includes a negative going square wave pulse of magnitude $$-\frac{E_c}{2}$$

This, of course, arises from the charging voltage $E_c$ appearing on the delay line prior to time $t_1$ being divided between the characteristic impedance of the line and the equal value R of resistance 17 during the discharge interval $t_1$–$t_3$. At time $t_3$ it will be noted that the discharge current $i_2$, which has a magnitude of $$\frac{E_c}{2R}$$

goes to zero since there is no energy left in the line. The pulse appearing across resistance 17 thus terminates at time $t_3$, and moreover, the current $i_3$ to the supply through the diode 21 remains at zero since the voltage on both sides of the diode is now equal to zero (see waveforms $e_4$ and $e_5$). Hence, no action takes place in the circuit until time $t_4$ when the trigger voltage wave $e_1$ reverts to the off condition and opens the switching devices 22 and 27.

With the switching devices 22 and 27 opened a time $t_4$ the instantaneous voltage across switching device 22 is equal to $$\frac{E_c}{2}$$

by virtue of the voltage divider action which now takes place between the characteristic impedance of the delay line 11 and equal value R of the charging resistance 13. This state of events will be noted from waveform $e_5$ at time $t_4$ and the current $i_5$ through the switching device 22, which reverts from the short circuit value of $$\frac{E_c}{R}$$

to zero at this time. At time $t_4$ the discharging resistance 17 is effectively removed from the circuit since the polarity of the current $i_2$ is such as to render the diode 26 conductive to hence provide a short circuit across the resistance 17. Accordingly, charging current $i_3$, which at time $t_4$, is the same as the current $i_4$ through resistance 13 flows through diode 21, delay line 11, and diode 26, to ground, to thus complete the circuit. Inasmuch as the resistance 13 has a value R equal to the characteristic impedance of the delay line 11, the charging action proceeds to completion in a time interval equal to twice the one-way delay time of the line, which interval is depicted as $t_4$–$t_6$. At the end of this charging interval, the line is fully charged to the magnitude $E_c$ (see $e_4$ at time $t_6$). The currents $i_2$, $i_3$, and $i_4$ through the various portions of the charging path thus go to zero at time $t_6$. The circuit is now, of course, primed for the generation of another pulse at time $t_7$ when the trigger pulse wave $e_1$ returns to the on condition. Another cycle of the discharging action is initiated at this time in a similar manner to that described hereinbefore, which results in the generation of a pulse in the time interval $t_7$–$t_9$ equal to twice the one-way delay time of the line 11. Similarly, a subsequent charging cycle occurs in the time interval $t_{10}$–$t_{12}$ analogous to that occurring in the time interval $t_4$–$t_6$.

From the foregoing, it will be appreciated that the circuit will function properly where the trigger pulse wave $e_1$ possesses shorter on and off pulse widths than those depicted in FIGURE 2. More particularly, the on and off pulse widths of wave $e_1$ may be made respectively equal to the discharging and charging intervals $t_1$–$t_3$ and $t_4$–$t_6$. In other words, the waiting interval $t_3$–$t_4$ may be eliminated and the circuit charged immediately upon discharge and vice versa. This is, of course, commensurate with driving of the circuit by the trigger pulse wave $e_1$ at a duty cycle of 50 percent and a repetition rate equal to one-half the reciprocal of the pulse width of the generated output pulses. As noted hereinbefore, the waveforms in FIGURE 2 assume ideal circuit conditions which are requisite to the driving of the circuit at the maximum theoretical duty cycle and repetition rate, just noted. In actual practice, the ideal conditions are, of course, not attainable; however, through the employment of semiconductor diodes as the diodes 21 and 26, and near ideal semiconductor switching devices, such as transistors, as the switching devices 22 and 27, conditions are obtained which vary closely approximate ideal. Under actual operating conditions, there is some slight departure from the waveforms of FIGURE 2, the waveforms having finite rise and fall times which limit the repetition rate and duty cycle at which the circuit may be driven to values somewhat less than the maximum theoretical possible. However, the rise and fall times of the pulses in the circuit under actual conditions are relatively short by virtue of the negligible capacitance of the diodes 21 and 26 and the near ideal switching of devices 22 and 27. Maximum duty cycles and repetition rates closely approaching the maximum theoretical possible are hence obtainable with the circuit of the present invention. In fact, in actual practice it has been demonstrated that the circuit of FIGURE 1 is capable of generating pulses of approximately 30 millimicroseconds length, 6 volts amplitude, and 250 milliamperes peak current at duty cycles of 30 percent and repetition rates of 10 megacycles.

Although the present invention has been described hereinbefore with respect to a single preferred embodiment, it will be appreciated that various changes and modifications may be made therein without departing from the spirit and scope of the invention. For example, the resistances 13 and 17 may be changed in value to deviate from a value equal to the characteristic impedance of the delay line 11 to vary considerably the discharge action by the generation of multiple reflection along the length of the line. By changing the ratios of the resistances of the characteristic impedance of the line, the wave patterns can be considerably modified from those depicted in FIGURE 2 to perform various other useful functions. Moreover, in those special cases where a square wave is not available as a trigger pulse, and the trigger pulse is a pulse shorter than the output pulses formed by the delay line, the drive voltage to the control terminals of switching devices 22 and 27 may be supplemented with the pulse formed across the discharging resistance 17 and, therefore, the output terminals 18 and 19. In other words, the initial switching action of switching devices 22 and 27 can be accomplished by the leading edge of the trigger pulse waveform $e_1$. Feedback may then be taken from the output waveform $e_3$ to sustain the switch drive to switching devices 22 and 27 until the output pulse terminates. When the output pulse terminates the switch drive to switching devices 22 and 27 ceases and same open to permit charging of the line 11. Thus, it is not intended to limit the invention, except by the terms of the appended claims.

What is claimed is:

1. A pulse generator comprising a delay line, charging means including a resistance equal to the characteristic impedance of said line for charging said line through said resistance, discharging means including a second resistance equal to the characteristic impedance of said line for discharging said line through said second resistance, means coupling said charging means to a first end of said line during a first time interval equal to at least twice the one way delay time of said line and decoupling said charging means from the first end of said line during a second time interval equal to at least twice the one way delay time of said line, and means coupling said discharging means to a second end of said line during said second time interval and decoupling said discharging means from said second end of said line during said first time interval, whereby a pulse is developed across said second resistance having a duration equal to twice the one-way delay time of said line during said second time interval.

2. A pulse generator according to claim 1, further defined by said first time interval and said second time interval being respectively equal to twice the one-way delay time of said line.

3. A pulse generator comprising a delay line, charging means including a resistance and voltage supply connected in series, semiconductor switching means having negligible capacitance and contact resistance for coupling said charging means to a first end of said line when in a first switching state and decoupling said charging means from the first end of said line when in a second switching state, discharging means including a second resistance, second semiconductor switching means having negligible capacitance and contact resistance and having first and second switching states for coupling said discharging means to a second end of said line when said second switching state and decoupling said discharging means from the second end of said line when in said first switching state, and trigger means coupled to said first and second switching means for simultaneously triggering same alternately between said first and second switching states.

4. A pulse generator comprising a delay line including first and second conductors, a charging resistance, a voltage supply having a first terminal connected to said charging resistance and a second terminal connected to ground, a diode connecting said charging resistance in series with a first end of the first conductor of said delay line, said diode having an orientation commensurate with forward biasing thereof by the voltage polarity at said first terminal of said voltage supply, a near ideal three-terminal switching device having first and second switching terminals respectively connected to the juncture between said charging resistance and said diode and to ground, said switching device being respectively conductive and nonconductive between said first and second switching terminals in response to the presence and absence of pulses at a control terminal thereof, a discharging resistance connected between said second conductor of said delay line and ground, a second diode connected in parallel with said discharging resistance and having an orientation commensurate with reverse biasing thereof by the voltage polarity of said second conductor of said delay line, a second near ideal three-terminal switching device having first and second switching terminals respectively connected to the second end of said first conductor of said delay line and to ground, said second switching device being respectively conductive and nonconductive between the first and second switching terminals thereof in response to the presence and absence of pulses at a control terminal thereof, and an input terminal commonly connected to the control terminals of said first and second switching devices for receiving trigger pulses.

5. A pulse generator according to claim 4, further defined by said first and second diodes being semiconductor diodes, said first and second switching devices being three-terminal semiconductor switching devices having negligible capacitance and contact resistance, and by said charging and discharging resistances, and by said charging and discharging resistance being respectively equal to the characteristic impedance of said delay line.

6. A pulse generator comprising a delay line, charging means including a first resistance and voltage supply connecting in series, said resistance being equal to the characteristic impedance of said delay line, semiconductor switching means having negligible capacitance and contact resistance for coupling said charging means to a first end of said line in response to a first switching state and decoupling said charging means from the first end of said line in response to a second switching state, discharging means including a second resistance, said second resistance being equal to the characteristic impedance of said delay line, second semiconductor switch means having negligible capacitance and contact resistance and having first and second switching states for coupling said discharging means to a second end of said line in response to said second switching state and decoupling said discharging means from the second end of said line in response to said first switching state, and trigger means coupled to said first and second switching means for simultaneously triggering said first and second switching means alternately between said first and second switching states, said trigger means triggering said first and second switching means between said first and second switching states at time intervals substantially equal to twice the one way delay time of said delay line.

References Cited by the Examiner

UNITED STATES PATENTS

| | | | |
|---|---|---|---|
| 2,697,784 | 12/1954 | Blyhe | 328—67 |
| 2,900,533 | 8/1959 | Howes | 307—88.5 |

ARTHUR GAUSS, *Primary Examiner.*

J. HEYMAN, *Examiner.*

J. ZAZWORSKY, *Assistant Examiner.*